United States Patent
Suga et al.

(10) Patent No.: US 8,646,807 B2
(45) Date of Patent: Feb. 11, 2014

(54) COMPONENT ARRANGEMENT STRUCTURE AT ROOF SIDE RAIL

(75) Inventors: Hitoshi Suga, Nagoya (JP); Lahana Quentin, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/520,266

(22) PCT Filed: Mar. 2, 2011

(86) PCT No.: PCT/JP2011/054782
§ 371 (c)(1),
(2), (4) Date: Jul. 2, 2012

(87) PCT Pub. No.: WO2012/117540
PCT Pub. Date: Sep. 7, 2012

(65) Prior Publication Data
US 2013/0334799 A1    Dec. 19, 2013

(51) Int. Cl.
*B60R 21/16*    (2006.01)
(52) U.S. Cl.
USPC ........................................ 280/730.2; 280/749
(58) Field of Classification Search
USPC ........................................ 280/730.2, 748, 749
See application file for complete search history.

(56) References Cited

U.S. PATENT DOCUMENTS

| | | | | |
|---|---|---|---|---|
| 6,296,275 | B1 * | 10/2001 | Schirle | 280/743.1 |
| 6,390,526 | B1 * | 5/2002 | Ament et al. | 296/37.16 |
| 6,595,567 | B1 * | 7/2003 | Ament et al. | 296/24.43 |
| 6,598,921 | B2 * | 7/2003 | Seel et al. | 296/24.43 |
| 7,125,069 | B2 * | 10/2006 | Cacucci et al. | 296/190.03 |
| 7,213,856 | B2 * | 5/2007 | Katada | 296/24.43 |
| 2006/0175814 | A1 * | 8/2006 | Jang et al. | 280/730.2 |

FOREIGN PATENT DOCUMENTS

| | | |
|---|---|---|
| JP | A-4-121239 | 4/1992 |
| JP | A-9-290690 | 11/1997 |
| JP | A-10-297377 | 11/1998 |
| JP | A-2002-283945 | 10/2002 |
| JP | A-2003-504258 | 2/2003 |
| JP | A-2003-509270 | 3/2003 |
| JP | A-2007-237894 | 9/2007 |
| JP | A-2009-56873 | 3/2009 |
| JP | A-2009-126297 | 6/2009 |
| JP | A-2009-226957 | 10/2009 |
| JP | A-2011-1042 | 1/2011 |

OTHER PUBLICATIONS

International Search Report issued in International Patent Application No. PCT/JP2011/054782 dated Jun. 7, 2011 (with translation).

* cited by examiner

*Primary Examiner* — Faye M. Fleming
(74) *Attorney, Agent, or Firm* — Oliff PLC (57) ABSTRACT

A roof side rail component arrangement structure capable of easily assuring space for arrangement of a curtain airbag inflator and a barrier net anchoring bracket at a roof side rail between a center pillar and a rear seat assist grip. In this roof side rail component arrangement structure, an inflator for a curtain airbag and a barrier net anchoring bracket are disposed at a roof side rail between a center pillar and a rear seat assist grip. The barrier net anchoring bracket includes a body fixing portion and a barrier net anchoring portion, and is formed in an open cross-section shape that opens diagonally to the lower side and to the vehicle width direction outer side. The inflator is disposed between the body fixing portion and the barrier net anchoring portion.

9 Claims, 6 Drawing Sheets

COMPONENT ARRANGEMENT STRUCTURE AT ROOF SIDE RAIL

TECHNICAL FIELD

The present invention relates to a component arrangement structure for arranging vehicle components at a roof side rail of a vehicle.

BACKGROUND ART

Japanese Patent Application Laid-Open (JP-A) No. H9-290690 discloses a cargo net device (a barrier net device) that divides a luggage compartment at a vehicle rear portion from a cabin in which a driver and the like sits. When a cargo net (a barrier net) of this device is to be used, the cargo net is unwound from inside a housing provided at an upper end side of a backrest (seatback) of a rear seat. A stay that is provided with a fixed hook portion and a hook portion are fixed to an end edge portion of the cargo net. An anchor portion is provided at the fixed hook portion and the hook portion, and the anchor portions are fitted into and anchored at anchoring members (anchoring brackets) provided at a roof side rail. Thus, the cargo net is put into a usage condition.

JP-A No. 2009-226957 discloses a curtain airbag device that protects an occupant during a side collision or the like of a vehicle. This curtain airbag device is provided with a curtain airbag, which is arranged in a folded state along a roof side rail, and an inflator, which supplies gas to the interior of the curtain airbag. The inflator is fixed to the roof side rail between a middle pillar (center pillar) and a rear seat assist grip that is fixed to the roof side rail at the vehicle rearward side of the middle pillar.

SUMMARY OF INVENTION

Technical Subject

When the barrier net as described above is intended to set in a vehicle rearward vicinity of the front seat, that is, in order to use the barrier net in a state in which the rear seat is tilted forward and the luggage compartment is enlarged, the barrier net anchoring bracket must be set at the roof side rail between a center pillar and a rear seat assist grip.

However, in a vehicle in which the curtain airbag device as described above is installed, the folded curtain airbag and the inflator or the like are arranged at the roof side rail between the center pillar and the rear seat assist grip. Therefore, it is difficult to set the barrier net anchoring bracket to an optimum position of the roof side rail, and it is difficult to sufficiently assure luggage space.

In consideration of the situation described above, a subject of the present invention is to provide a roof side rail component arrangement structure that may easily assure space for arranging a curtain airbag inflator and a barrier net anchoring bracket at a roof side rail between a center pillar and a rear seat assist grip.

Solution to Subject

A component arrangement structure at a roof side rail relating to a first aspect of the invention includes: an inflator that is disposed between a rear seat assist grip and a center pillar, that is fixed to a roof side rail, and that supplies gas into a curtain airbag, the rear seat assist grip being fixed to the roof side rail at a vehicle rearward side of the center pillar, and the curtain airbag being arranged along the roof side rail in a folded state; and a barrier net anchoring bracket that is disposed at a position that overlaps with the inflator as viewed in a vehicle width direction, that is fixed to the roof side rail, and at which an upper anchor portion is to be anchored, the upper anchor portion being provided at a barrier net that divides a vehicle cabin between front and rear.

In the roof side rail component arrangement structure of the first aspect, the curtain airbag inflator is disposed between the center pillar and the rear seat assist grip and is fixed to the roof side rail. The barrier net anchoring bracket is disposed at a position that overlaps with the inflator as viewed in the vehicle width direction and is fixed to the roof side rail. The upper anchor portion provided at the barrier net is anchored at this barrier net anchoring portion. Thus, the vehicle cabin is divided between front and rear by the barrier net.

In the present invention, as described above, the barrier net anchoring bracket is disposed at a position that overlaps with the inflator as viewed in the vehicle width direction. Therefore, space for arrangement of the inflator and the barrier net anchoring bracket at the roof side rail between the center pillar and the rear seat assist grip may be easily assured.

A component arrangement structure at a roof side rail relating to a second aspect of the invention is the component arrangement structure at a roof side rail according to the first aspect, in which the barrier net anchoring bracket includes a body fixing portion that is fixed to the roof side rail, and a barrier net anchoring portion that is disposed at the vehicle width direction inner side relative to the body fixing portion and at which the upper anchor portion is to be anchored, and the inflator is disposed between the body fixing portion and the barrier net anchoring portion.

In the roof side rail component arrangement structure of the second aspect, the inflator is disposed between the body fixing portion and barrier net anchoring portion that are provided at the barrier net anchoring bracket. Thus, because the inflator is disposed within the cross section of the barrier net anchoring bracket, space for arrangement of the inflator and the barrier net anchoring bracket may be reduced.

A component arrangement structure at a roof side rail relating to a third aspect of the invention is the component arrangement structure at a roof side rail according to the second aspect, in which the barrier net anchoring bracket forms an open cross-section shape that opens to the lower side.

In the roof side rail component arrangement structure of the third aspect, the inflator may be easily inserted between the body fixing portion and the barrier net anchoring portion from the lower side, using the opening in the barrier net anchoring bracket. Therefore, the work characteristics of assembly of the inflator to the roof side rail may be assured while the space for arrangement of the inflator and the barrier net anchoring bracket may be reduced.

A component arrangement structure at a roof side rail relating to a fourth aspect of the invention is the component arrangement structure at a roof side rail according to the second aspect or the third aspect, in which an inclined portion that extends diagonally to the lower side and to the vehicle width direction outer side, so as to follow along an inner panel of the roof side rail, is provided at a vehicle width direction outer side end portion of a ceiling member of the vehicle cabin, and the barrier net anchoring bracket is disposed between the inclined portion and the inner panel, the body fixing portion is inclined along the inner panel, and the barrier net anchoring portion is inclined along the inclined portion.

In the roof side rail component arrangement structure of the fourth aspect, the body fixing portion of the barrier net anchoring bracket is inclined along the inner panel of the roof side rail. Therefore, a contact area between the inner panel and the body fixing portion may be assuredly large, and a strength of fixing of the barrier net anchoring bracket to the roof side rail may be improved. In addition, in this aspect, the barrier net anchoring portion of the barrier net anchoring bracket is inclined along the inclined portion provided at the ceiling member (roof head lining). Therefore, a contact area between the inclined portion of the ceiling member and the barrier net anchoring portion may be assuredly large, and unwanted flexing of the ceiling member ("sagging") may be suppressed.

A component arrangement structure at a roof side rail relating to a fifth aspect of the invention is the component arrangement structure at a roof side rail according to any one of the second to fourth aspects, in which the body fixing portion is disposed at a position at which a portion thereof that is attached and fixed to the roof side rail does not overlap with the barrier net anchoring portion or the inflator as viewed in an attachment direction.

In the roof side rail component arrangement structure of the fifth aspect, when the body fixing portion of the barrier net anchoring bracket is attached and fixed to the roof side rail by the structure described above, interference between the barrier net anchoring portion and the inflator may be avoided. Therefore, the work characteristics of assembly of the barrier net anchoring bracket to the roof side rail may be excellent.

A component arrangement structure at a roof side rail relating to a sixth aspect of the invention is the component arrangement structure at a roof side rail according to any one of the second to fifth aspects, in which an anchoring hole at which the upper anchor portion is to be fitted and anchored is formed in the barrier net anchoring portion, a resin cover is mounted at the barrier net anchoring portion, and the ceiling member of the vehicle cabin is sandwiched between the resin cover and the barrier net anchoring portion, the resin cover being provided with a door that is closable and openable between a closed position that covers the anchoring hole from the vehicle cabin inner side and an open position at which the anchoring hole is exposed to the vehicle cabin inner side.

In the roof side rail component arrangement structure of the sixth aspect, the anchoring hole in which the upper anchor portion of the barrier net is fitted and anchored is formed in the barrier net anchoring portion of the barrier net anchoring bracket, and the resin cover is mounted at the barrier net anchoring portion. The door that is capable of closing and opening, between the closed position that covers the anchoring hole from the vehicle cabin inner side thereof and the open position at which the anchoring hole is exposed to the vehicle cabin inner side, is provided at the resin cover. Therefore, by the door being disposed at the closed position when the barrier net is not in use, the anchoring hole may be prevented from being seen from the vehicle cabin inner side. In addition, the ceiling member (roof head lining) of the vehicle cabin is sandwiched between the resin cover and the barrier net anchoring portion. Therefore, unwanted flexing of the ceiling member ("sagging") may be suppressed.

A component arrangement structure at a roof side rail relating to a seventh aspect of the invention is the component arrangement structure at a roof side rail according to any one of the second to sixth aspects, further including a protector that is disposed between the barrier net anchoring portion and the inflator, that is mounted to the barrier net anchoring portion, and that prevents the upper anchor portion from abutting against the inflator.

In the roof side rail component arrangement structure of the seventh aspect, when the upper anchor portion provided at the barrier net is being fitted and anchored at the anchoring hole formed in the barrier net anchoring portion of the barrier net anchoring bracket, abutting of the upper anchor portion against the inflator is prevented by the protector. Therefore, damage to the inflator by the upper anchor portion may be prevented.

A component arrangement structure at a roof side rail relating to an eighth aspect of the invention is the component arrangement structure at a roof side rail according to any one of the first to seventh aspects, in which the inflator is disposed in a state in which a length direction thereof is along the vehicle front-rear direction, and the inflator is fixed to the roof side rail via mounting brackets at both a vehicle forward side and a vehicle rearward side of the barrier net anchoring bracket.

In the roof side rail component arrangement structure of the eighth aspect, the inflator that is disposed with the length direction thereof along the vehicle front-rear direction is fixed to the roof side rail via the mounting brackets that are at both the vehicle forward side and the vehicle rearward side of the barrier net anchoring bracket. Therefore, the long, narrow inflator may be securely fixed to the roof side rail.

A component arrangement structure at a roof side rail relating to a ninth aspect of the invention is the component arrangement structure at a roof side rail according to any one of the first to eighth aspects, in which the barrier net is unwindably rolled up and stowed in a housing that is provided at an upper end side of a tilting-type rear seatback that structures a rear seat, and in a state in which the rear seatback is tilted forward, the barrier net anchoring bracket is disposed above the housing as viewed in the vehicle width direction.

In the roof side rail component arrangement structure of the ninth aspect, the barrier net is unwindably rolled up and stowed in the housing provided at the upper end side of the rear seatback. When the rear seatback is tilted forward, the housing is disposed at the front end side of the rear seat. In this state, the barrier net stowed in the housing is unwound, the upper anchor portion of the barrier net is anchored at the barrier net anchoring bracket, and the vehicle cabin is divided between front and rear at the front end side of the rear seat. Furthermore, because the barrier net anchoring bracket is disposed above the housing in this state, the barrier net extends in the up-down direction or substantially in the up-down direction. Therefore, the appearance and the like of the barrier net when in use may be excellent.

Advantageous Effects of Invention

As described above, with a roof side rail component arrangement structure relating to the present invention, space for arrangement of a curtain airbag inflator and a barrier net anchoring bracket at a roof side rail between a center pillar and a rear seat assist grip may be easily assured.

BEST MODE FOR CARRYING OUT THE INVENTION

Herebelow, a roof side rail component arrangement structure 10 relating to an exemplary embodiment of the present invention is described using FIG. 1 to FIG. 6. The arrow FR in the drawings indicates a vehicle forward side, the arrow UP indicates the vehicle upward side, and the arrow IN indicates the inner side in the vehicle width direction.

Figure 1:
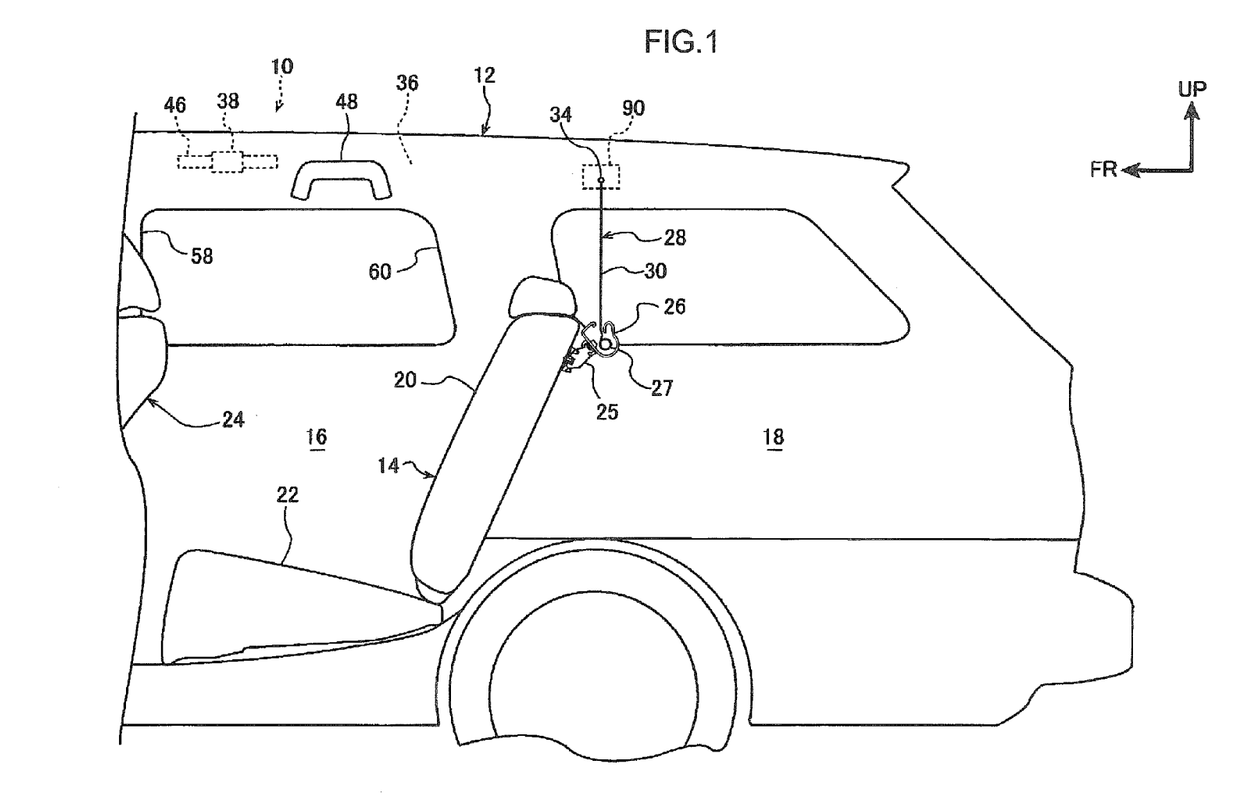
FIG. 1 is a schematic vertical sectional diagram showing partial structure of a vehicle in which a roof side rail component arrangement structure relating to an exemplary embodiment of the present invention is employed.

As illustrated in FIG. 1, a vehicle 12 relating to the present exemplary embodiment is a station wagon-type automobile. A luggage space 18 (luggage compartment) that is continuous with a cabin space 16 is provided at the vehicle rearward side of a rear seat 14. The rear seat 14 is provided with a tilting-type rear seatback 20. The lower end side of the rear seatback 20 is joined to the vehicle body via an unillustrated hinge. The rear seatback 20 is tiltable between the upright position shown in FIG. 1 and the tilted forward position shown in FIG. 2. In a state in which the rear seatback 20 is disposed at the tilted forward position, the rear seatback 20 is put over a seat cushion 22, and the luggage space 18 is enlarged as far as vicinity at the vehicle rearward side of a front seat 24.

Figure 3:
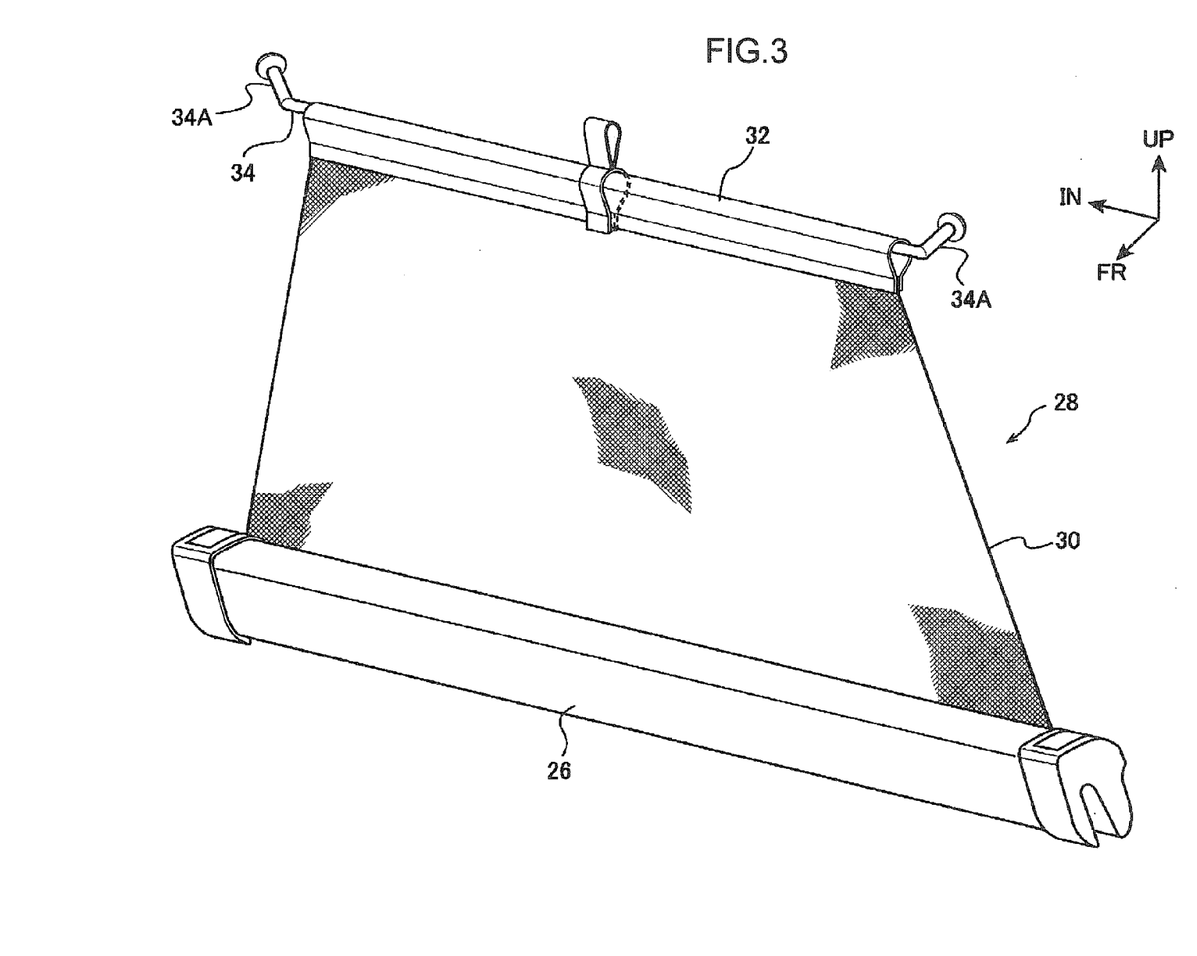
FIG. 3 is a perspective diagram of a barrier net that is shown in FIG. 1 and FIG. 2.

A housing 26 for a barrier net is provided at the rear face side of an upper end portion of the rear seatback 20 (see FIG. 3). The housing 26 is formed in a long, narrow box shape along the vehicle width direction, and is mounted to the rear face of the rear seatback 20 via a bracket 25. A length dimension of the housing 26 is set to substantially equal a width dimension (a dimension along the vehicle width direction) of the rear seatback 20.

Inside the housing 26, a long, thin winding spindle 27 (see FIG. 1 and FIG. 2) is arranged along the length direction of the housing 26. This winding spindle 27 is rotatably supported in the housing 26, and is urged one way about its axis by an urging unit such as a spiral spring or the like. A barrier net 28 is unwindably rolled up on the winding spindle 27 and stowed.

The barrier net 28 divides the vehicle cabin into front and rear, within the cabin space 16 and the luggage space 18. Thus, the barrier net 28 is for restraining luggage in the luggage space 18 from entering the cabin space 16. The barrier net 28 is provided with a net main body 30 that is formed of a net-form material with flexibility. The net main body 30 is formed in a trapezoid shape in the deployed state thereof. In the following descriptions, an end portion at a bottom edge side of the net main body 30 formed in the trapezoid shape is referred to as a lower end portion and an end portion at an upper edge side of the same is referred to as an upper end portion.

The lower end portion of the net main body 30 is anchored at the winding spindle 27. The net main body 30 is rolled up on the winding spindle 27, starting from the lower end side of the net main body 30, and is stowed inside the housing 26. The net main body 30 is unwound out of the housing 26, starting from the upper end side of the net main body 30, through a slit formed in the housing 26. A rod-retaining cloth 32 (not illustrated in the drawings apart from FIG. 3), which is formed of a sheet-form material with flexibility, is sewn to the upper end portion of the net main body 30 in a state of being folded into a substantial tube shape. An upper anchor rod 34 (upper anchor portions), which is formed of a rod member made of metal, is inserted inside the rod-retaining cloth 32. The upper anchor rod 34 is retained at the upper end portion of the net main body 30 by the rod-retaining cloth 32 in a state in which the length direction of the upper anchor rod 34 is in the vehicle width direction. An anchored portion 34A is provided at each of the two length direction end portions of the upper anchor rod 34 and protrudes outside of the rod-retaining cloth 32. These anchored portions 34A correspond with barrier net anchoring brackets 38 that are provided at roof side rails 36.

Figure 4:
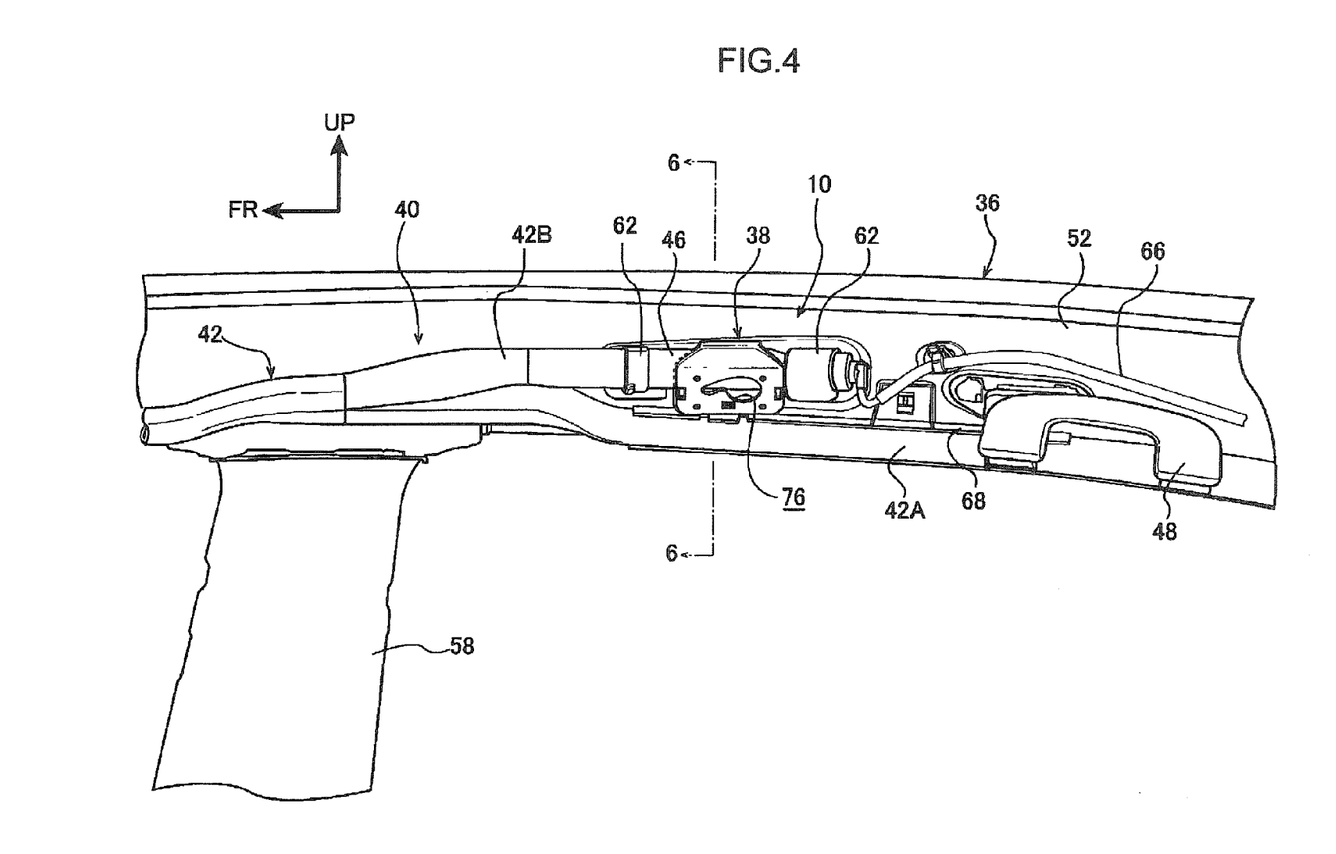
FIG. 4 is a sectional diagram showing structures peripheral to a roof side rail that is shown in FIG. 1 and FIG. 2.
Figure 5:
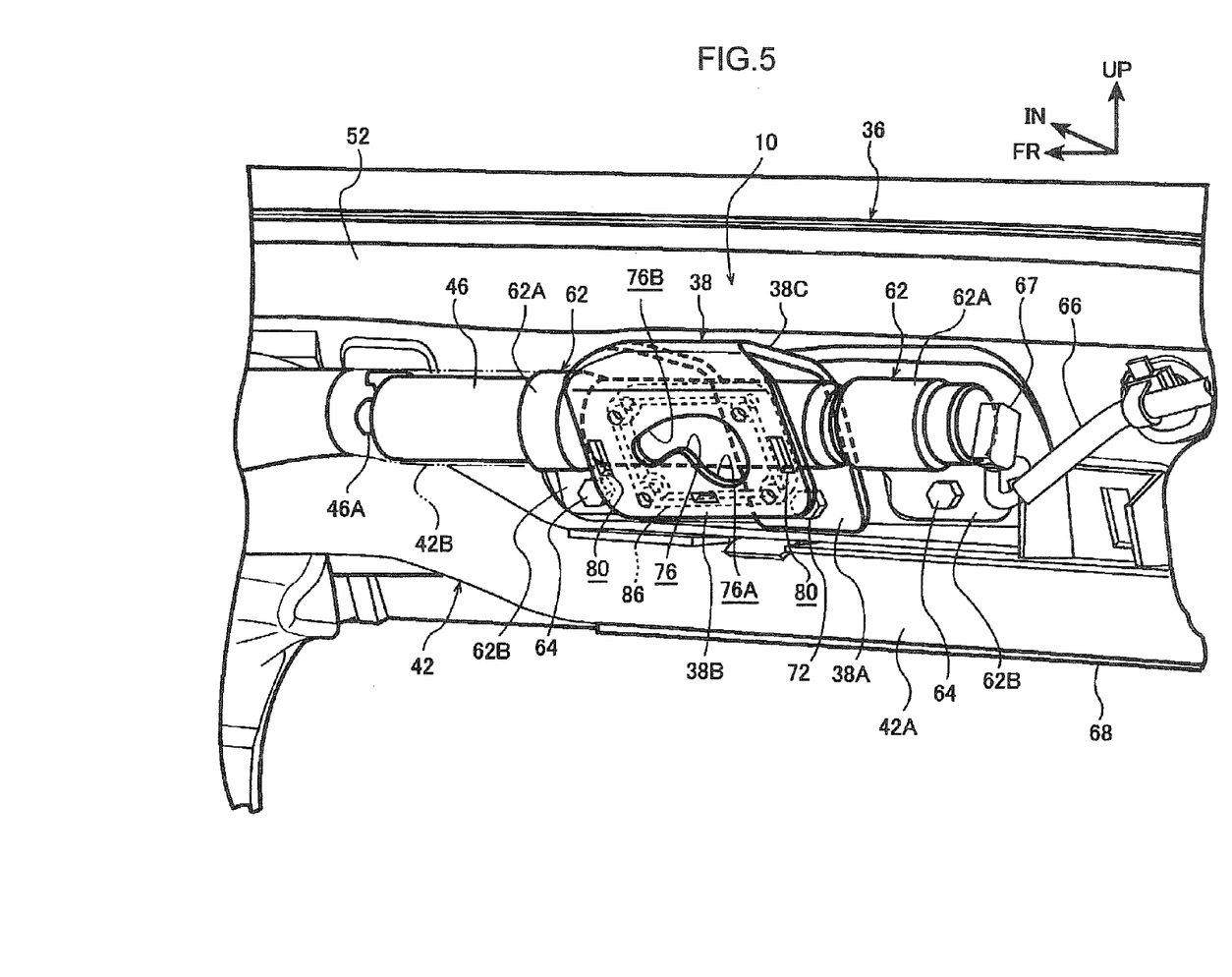
FIG. 5 is a magnified perspective diagram of a portion of FIG. 4.
Figure 6:
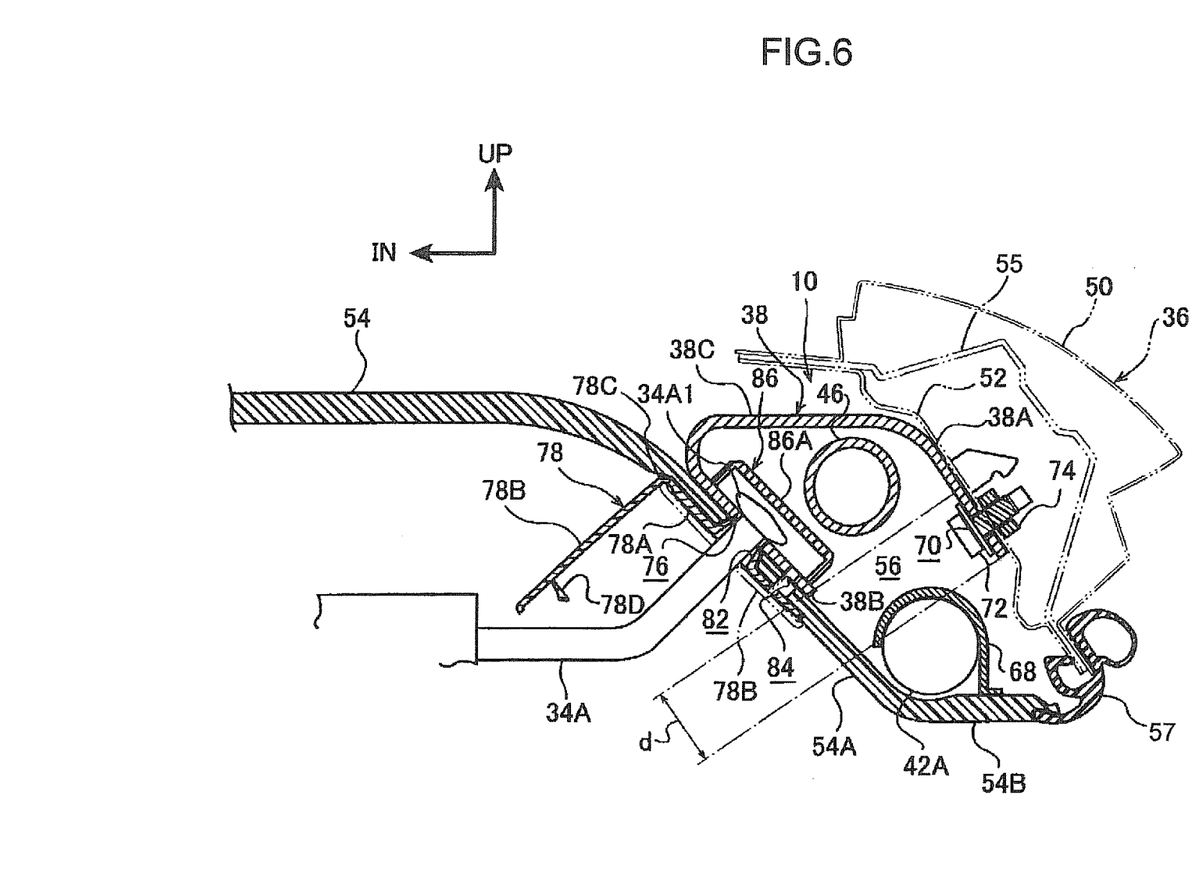
FIG. 6 shows a magnified vertical sectional diagram cut along line 6-6 of FIG. 4.

FIG. 4 shows a side view, viewed from the vehicle cabin side, of structures peripheral to each roof side rail 36. FIG. 5 shows a magnified perspective view in which a portion of FIG. 4 is magnified, and FIG. 6 shows a magnified vertical sectional view cut along line 6-6 of FIG. 4. As illustrated in these drawings, in the present exemplary embodiment, as well as the barrier net anchoring bracket 38, a curtain airbag 42 and an inflator 46, which are structural members of a curtain airbag device 40, and components such as a rear seat assist grip 48 and the like are arranged at the roof side rail 36.

As illustrated in FIG. 6, the roof side rail 36 has a closed cross-section structure constituted by an outer panel 50, an inner panel 52 and a reinforcement 55. A roof head lining 54 that constitutes a ceiling member of the vehicle cabin is arranged at the vehicle width direction inner side of the roof side rail 36 (not shown in FIG. 4 and FIG. 5). An inclined portion 54A, which extends diagonally to the lower side and to the vehicle width direction outer side, is provided at a vehicle width direction outer side end portion of the roof head lining 54. The inclined portion 54A is inclined so as to follow along the inner panel 52 of the roof side rail 36. A cavity 56, which extends along the roof side rail 36 in the vehicle front-rear direction, is formed between the inclined portion 54A and the inner panel 52. A horizontal portion 54B protrudes to the vehicle width direction outer side from a lower end portion of the inclined portion 54A. A vehicle width direction outer side end portion of the horizontal portion 54B engages with a weather strip 57, which is mounted at a lower end portion of the roof side rail 36.

The structures peripheral to the roof side rail that are described above are the same at a right side portion and a left side portion of the vehicle body, apart from being constituted with left-right symmetry. Accordingly, in the following recitations the structures at the right side portion of the vehicle body shown in FIG. 1, FIG. 2, and FIG. 4 to FIG. 6 are described, and descriptions of structures at the left side portion of the vehicle body are not given.

As illustrated in FIG. 4, the rear seat assist grip 48 is fixed to the inner panel 52 of the roof side rail 36 at the vehicle rearward side relative to a center pillar 58 (a B pillar). The rear seat assist grip 48 is a handle for an occupant of the rear seat 14 to support their body when entering and leaving the vehicle and when the vehicle is running or the like. A main body portion of the rear seat assist grip 48, which is gripped by the occupant, is disposed at the vehicle cabin inner side of the roof head lining 54.

The curtain airbag device 40 is for inflating and deploying the curtain airbag 42 and protecting occupants in the vehicle cabin during a side collision of the vehicle 12 or during a rollover. The curtain airbag 42 is disposed in the cavity 56 at usual times. The curtain airbag 42 is arranged along the roof side rail 36 in a state in which an airbag main body 42A that constitutes the main body portion of the curtain airbag 42 is folded up. For convenience of description in FIG. 6, a cross section of the airbag main body 42A is illustrated schematically.

In the folded state, the airbag main body 42A has a long, narrow, substantially cylindrical outer profile. One length direction end portion of the airbag main body 42A (a front end portion) is disposed above an unillustrated front pillar (an A pillar), and the other length direction end portion (a rear end portion) is arranged above a rear pillar 60 (a C pillar; see FIG. 1 and FIG. 2).

A gas introduction portion 42B is connected to a vehicle front-rear direction central portion of the airbag main body 42A at an upper vicinity of the center pillar 58. The gas introduction portion 42B is for introducing gas into the airbag main body 42A. The gas introduction portion 42B is formed in a tubular shape, and extends to the vehicle rearward side at the upper side of the airbag main body 42A. A rear end portion of the gas introduction portion 42B is open, and a front end side of the inflator 46 is inserted into the gas introduction portion 42B through this opening portion. An outer profile of the inflator 46 forms a long, narrow, cylindrical shape. The inflator 46 is disposed in the cavity 56 at the vicinity of a central portion between the center pillar 58 and the rear seat assist grip 48, in a state in which the length direction of the inflator 46 is along the vehicle front-rear direction.

As illustrated in FIG. 5, the inflator 46 is fixed to the roof side rail 36 by a pair of front and rear mounting brackets 62 (clamps). Each mounting bracket 62 is formed by bending machining of a plate made of metal, and includes a curved portion 62A and a pair of attachment portions 62B. The curved portion 62A is curved and formed so as to wrap around an outer periphery portion of the inflator 46. The attachment portions 62B respectively extend from the two curving direction ends of the curved portion 62A and are superposed with one another substantially in the vehicle width direction. In FIG. 5, of the pair of attachment portions 62B that are superposed with one another, only the attachment portion 62B that is disposed at the vehicle inner side is illustrated. A bolt 64 that penetrates through the attachment portions 62B is threaded into a weld nut (not illustrated) that is welded to the inner panel 52 of the roof side rail 36. Thus, the mounting brackets 62 are attached and fixed to the inner panel 52, and the front end side and rear end side of the inflator 46 are restrained by the curved portions 62A of the mounting brackets 62.

A connector 67 is connected to a rear end portion of the inflator 46. The connector 67 is attached to an end portion of a harness 66. The harness 66 is connected to an unillustrated airbag electronic control unit (ECU) installed in the vehicle 12. The airbag ECU is electronically connected to a side impact sensor and a rollover sensor installed in the vehicle. When the sensors detect a side impact condition or a rollover condition of the vehicle, a detection signal is outputted to the airbag ECU. The airbag ECU determines whether or not to operate the curtain airbag device 40. If the result of this determination is positive, a predetermined current is supplied to the inflator 46 and the inflator 46 operates. Hence, gas is ejected through a gas ejection portion 46A (see FIG. 5) that is provided at the front end portion of the inflator 46, and the gas is introduced through the gas introduction portion 42B into the airbag main body 42A. As a result, the airbag main body 42A inflates, the horizontal portion 54B of the roof head lining 54 is pushed downward by inflation pressure of the airbag main body 42A, and a gap is formed between the horizontal portion 54B and the weather strip 57. Through this gap, the airbag main body 42A inflates and deploys in a curtain shape at a side portion of the vehicle cabin interior. The member that is marked with the reference number 68 in FIG. 4 to FIG. 6 is a protection member made of resin that prevents the airbag main body 42A from interfering with the roof side rail 36 during the inflation and deployment.

As illustrated in FIG. 6, in the present exemplary embodiment, the inflator 46 described above is disposed inside a space formed in the cross section of the barrier net anchoring bracket 38. This barrier net anchoring bracket 38 is formed by bending machining of a plate made of metal, and is disposed in the cavity 56 between the pair of front and rear mounting brackets 62. The barrier net anchoring bracket 38 is described in detail herebelow.

The barrier net anchoring bracket 38 is disposed at the upper side of the airbag main body 42A in the folded state, and includes a body fixing portion 38A, a barrier net anchoring portion 38B and a joining portion 38C. The barrier net anchoring portion 38B is disposed at the vehicle width direction inner side relative to the body fixing portion 38A. The joining portion 38C joins respective upper end portions of the body fixing portion 38A and the barrier net anchoring portion 38B in the vehicle width direction. The barrier net anchoring portion 38B is specified with a length dimension along the vehicle front-rear direction that is longer than the body fixing portion 38A. The inflator 46 is disposed between the body fixing portion 38A and the barrier net anchoring portion 38B. Thus, the barrier net anchoring bracket 38 is disposed at positions overlapping the inflator 46 as viewed in the vehicle width direction.

The body fixing portion 38A is inclined so as to follow along the inner panel 52 of the roof side rail 36, and extends diagonally to the lower side and toward the vehicle width direction outer side, from a vehicle width direction outer side end portion of the joining portion 38C. A bolt hole 70 is formed in a lower end portion (vehicle width direction outer side end portion) of the body fixing portion 38A. A bolt 72 is inserted into the bolt hole 70, and is threaded into a weld nut 74 that is welded to the inner panel 52. Thus, the body fixing portion 38A is attached and fixed to the inner panel 52 in a state in which a vehicle width direction outer side face of the body fixing portion 38A is in contact with the inner panel 52.

Meanwhile, the barrier net anchoring portion 38B is inclined so as to follow along the inclined portion 54A of the roof head lining 54, and extends diagonally to the lower side and toward the vehicle width direction outer side, from a vehicle width direction inner side end portion of the joining portion 38C. The inclined portion 54A of the roof head lining 54 is in contact with a vehicle width direction inner side face of the barrier net anchoring portion 38B.

That is, the barrier net anchoring portion 38B extends in the same direction as the body fixing portion 38A and is disposed to be substantially parallel with the body fixing portion 38A. Thus, the barrier net anchoring bracket 38 is formed in an open cross-section shape (substantially an inverted "U" shape in cross section) that opens at a lower side of the barrier net anchoring bracket 38. The inverted U shape extends diagonally to the lower side and to the vehicle width direction outer side.

Here, the body fixing portion 38A is disposed at a position such that the lower end portion that is attached and fixed to the inner panel 52 does not overlap with the barrier net anchoring portion 38B and the inflator 46 as viewed in an attachment direction thereof (an axial direction of the bolt 72). Therefore, space for inserting a tool for attaching the bolt 72 is assured. Note that the dimension d shown in FIG. 6 is specified to correspond with a size of the tool for screwing the bolt 72.

As illustrated in FIG. 5, an anchoring hole 76 is formed at a substantially central portion of the barrier net anchoring portion 38B. The anchoring hole 76 is formed substantially in an "L" shape overall, with a large diameter portion 76A and a small diameter portion 76B. The aforementioned upper anchor rod 34 of the barrier net 28 is fitted (inserted) into this anchoring hole 76. A brim portion 34A1, which has a smaller diameter than the large diameter portion 76A and a larger diameter than the small diameter portion 76B is provided at a distal end of the anchored portion 34A of the upper anchor rod 34 (see FIG. 6). Accordingly, the upper anchor rod 34 (the anchored portion 34A) is fitted into the anchoring hole 76, through the large diameter portion 76A side. When the anchored portion 34A is moved toward the small diameter portion 76B, the brim portion 34A1 engages with a hole edge portion of the small diameter portion 76B, and the upper anchor rod 34 is anchored at the barrier net anchoring portion 38B. Hence, the upper end portion of the barrier net 28 is anchored at the roof side rails 36 via the barrier net anchoring brackets 38.

A resin cover 78 is mounted at the barrier net anchoring portion 38B. The resin cover 78 is disposed at the opposite side of the inclined portion 54A of the roof head lining 54 from the side at which the barrier net anchoring portion 38B is disposed. The resin cover 78 is provided with a fixed portion 78A that is formed in a plate shape and a door 78B that is similarly formed in a plate shape. The fixed portion 78A and the door 78B are formed in rectangular shapes that are long in the vehicle front-rear direction, and upper end portions of the fixed portion 78A and door 78B are joined by an integral hinge 78C.

The fixed portion 78A includes a pair of unillustrated front and rear pawl portions that protrude to the barrier net anchoring portion 38B side. These pawl portions penetrate through penetrating holes formed in the inclined portion 54A of the roof head lining 54 and are fitted into and anchored at a pair of front and rear engaging holes 80 that are formed in the barrier net anchoring portion 38B (see FIG. 5). Thus, the resin cover 78 is fixed to the barrier net anchoring portion 38B (the barrier net anchoring bracket 38), and a portion of the inclined portion 54A of the roof head lining 54 is sandwiched between the fixed portion 78A and the barrier net anchoring portion 38B.

An insertion hole 82 with a similar shape to the anchoring hole 76 is formed at a position of the fixed portion 78A that corresponds with the anchoring hole 76 of the barrier net anchoring portion 38B. Further, an insertion hole with a similar shape to the anchoring hole 76 and the insertion hole 82 is formed at a position of the inclined portion 54A of the roof head lining 54 that corresponds with the anchoring hole 76 and the insertion hole 82. Thus, the anchoring hole 76 communicates with the vehicle cabin via this insertion hole and the insertion hole 82.

The door 78B is turnable relative to the fixed portion 78A, about the integral hinge 78C, between an open position that is shown by solid lines in FIG. 6 and a closed position that is shown by two-dot chain lines in FIG. 6. In the state in which the door 78B is disposed at the closed position, a pawl portion 78D that is provided at the door 78B fits into and anchors at an engaging hole 84 formed in the fixed portion 78A. Thus, the door 78B is retained at the closed position. In this state, the anchoring hole 76 is covered by the door 78B from the vehicle cabin inner side thereof. In the state in which the door 78B is disposed at the open position, the anchoring hole 76 is exposed to the vehicle cabin inner side. That is, the present exemplary embodiment has a structure in which the door 78B is turned to the open position when the upper anchor rod 34 of the barrier net 28 is to be fitted into and anchored at the anchoring hole 76.

In the present exemplary embodiment, a protector 86 is disposed between the barrier net anchoring portion 38B and the inflator 46. The protector 86 is formed of, for example, a resin material and is formed in a shallow-bottomed box shape of which the barrier net anchoring portion 38B side is open. The protector 86 is formed in a rectangular shape that is long in the vehicle front-rear direction as viewed in the thickness direction of the barrier net anchoring portion 38B. In a state in which end faces at the opening side of the protector 86 are in contact with the surface in the vehicle width direction outer side of the barrier net anchoring portion 38B, the protector 86 is screw-fixed to the barrier net anchoring portion 38B by unillustrated screws at the four corners thereof. A floor wall portion 86A of the protector 86 is interposed between the anchoring hole 76 and the inflator 46. A gap for disposing the brim portion 34A1 of the upper anchor rod 34 between the floor wall portion 86A and the barrier net anchoring portion 38B is assured.

Figure 2:
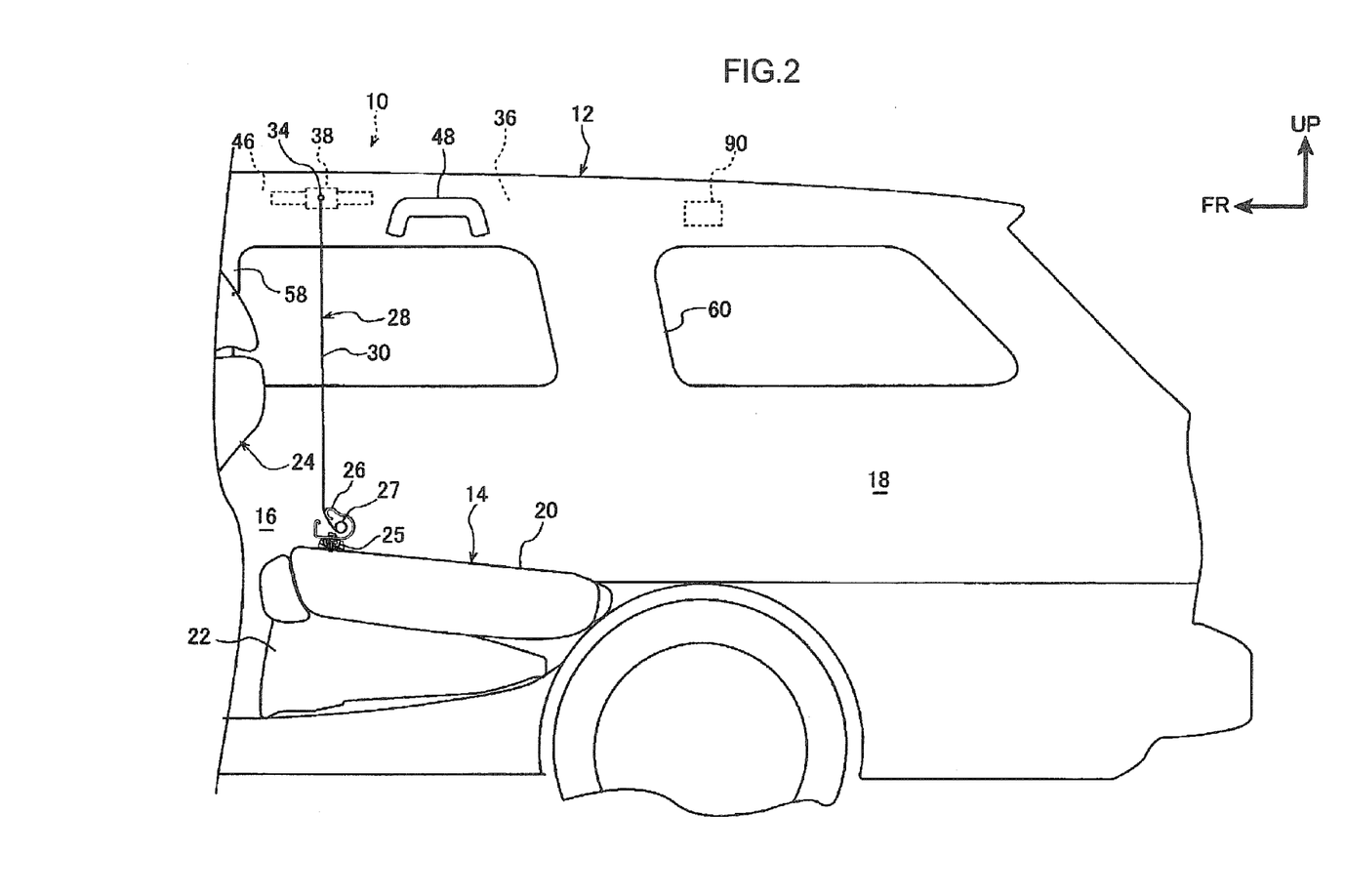
FIG. 2 is a vertical sectional diagram, corresponding to FIG. 1, showing a state in which a rear seatback of the vehicle shown in FIG. 1 is disposed at a tilted forward position.

In the present exemplary embodiment, in the state in which the rear seatback 20 is disposed at the tilted forward position shown in FIG. 2, the barrier net anchoring bracket 38 is positioned so as to be disposed just above the housing 26 as viewed in the vehicle width direction. In this state, when the barrier net 28 is unwound from the housing 26 and the upper anchor rod 34 is anchored at the barrier net anchoring bracket 38, the vehicle cabin is divided between front and rear by the barrier net 28, at a vehicle rearward vicinity of the front seat 24.

As illustrated in FIG. 1 and FIG. 2, another barrier net anchoring bracket 90 is arranged at the vehicle rearward side of the barrier net anchoring bracket 38. The barrier net anchoring bracket 90 has a basically similar structure to the barrier net anchoring bracket 38, and is fixed at the rear end side of the roof side rail 36. The barrier net anchoring bracket 90 is positioned so as to be disposed above the housing 26, as viewed in the vehicle width direction, in a state in which the rear seatback 20 is in the upright position shown in FIG. 1. Therefore, if the barrier net 28 is unwound from the housing 26 in this state and the upper anchor rod 34 is anchored at the barrier net anchoring brackets 90, the vehicle cabin is divided between front and rear by the barrier net 28 at a vehicle rearward vicinity of the rear seatback 20.

Next, operation and effects of the present exemplary embodiment are described.

In the present exemplary embodiment, the barrier net anchoring bracket 38 is disposed at a position overlapping with the inflator 46 as viewed in the vehicle width direction. Therefore, space for arrangement of the inflator 46 and the barrier net anchoring bracket 38 at the roof side rail 36 between the center pillar 58 and the rear seat assist grip 48 may be easily assured.

In other words, although the curtain airbag 42, the inflator 46, the rear seat assist grip 48 and the like are arranged at the roof side rail 36 at the rearward side of the center pillar 58, these components are arranged at optimal positions in accordance with their respective functions. Consequently, although it is difficult to find a sufficient space for arranging the barrier net anchoring bracket 38 separately at an optimum position, in the present exemplary embodiment the barrier net anchoring bracket 38 may be easily arranged at the optimum position with the structure described above.

That is, if the barrier net anchoring bracket 38 were arranged to avoid the curtain airbag 42, the inflator 46 and the like, the arrangement of the barrier net 28 in the usage state, which is determined by the position of the barrier net anchoring bracket 38, would be set to the vehicle rearward side. In this case, the luggage space 18 might not be sufficiently enlarged. However, this may be avoided with the present exemplary embodiment.

Moreover, in the present exemplary embodiment, the barrier net anchoring bracket 38 includes the body fixing portion 38A that is fixed to the roof side rail 36 and the barrier net anchoring portion 38B that is disposed at the vehicle width direction inner side relative to the body fixing portion 38A, and the inflator 46 is disposed between the body fixing portion 38A and the barrier net anchoring portion 38B. That is, because the inflator 46 is disposed within a cross sectional space of the barrier net anchoring bracket 38, space for arrangement of the inflator 46 and the barrier net anchoring bracket 38 may be minimized.

In the present exemplary embodiment, the barrier net anchoring bracket 38 forms an open cross-section shape that opens to the lower side. Therefore, when the inflator 46 is being mounted at the roof side rail 36, the inflator 46 may be easily inserted between the body fixing portion 38A and the barrier net anchoring portion 38B from the lower side using the opening of the barrier net anchoring bracket 38. Therefore, assembly of the inflator 46 to the roof side rail 36 may be assured to be easy while the inflator 46 and the barrier net anchoring bracket 38 may be arranged at optimum positions in a minimum amount of space.

In the present exemplary embodiment, the body fixing portion 38A of the barrier net anchoring bracket 38 is inclined along the inner panel 52 of the roof side rail 36. Therefore, a contact area between the inner panel 52 and the barrier net anchoring bracket 38 is assuredly large, and fixing strength of the barrier net anchoring bracket 38 to the roof side rail 36 is improved. Further, in the present exemplary embodiment, the barrier net anchoring portion 38B of the barrier net anchoring bracket 38 is inclined along the inclined portion 54A provided at the roof head lining 54. Therefore, a contact area between the inclined portion 54A and the barrier net anchoring portion 38B is assuredly large, and unfavorable flexing of the roof head lining 54 ("sagging") may be suppressed.

In the present exemplary embodiment, the lower end portion of the body fixing portion 38A of the barrier net anchoring bracket 38, which is attached and fixed to the roof side rail 36, is disposed at a position that does not overlap with the barrier net anchoring portion 38B and the inflator 46 as viewed in the attachment direction (the axial direction of the bolt 72). Therefore, when the body fixing portion 38A is being attached and fixed to the roof side rail 36, the barrier net anchoring portion 38B and the inflator 46 do not impede the body fixing portion 38A. Therefore, the assembly of the barrier net anchoring bracket 38 to the roof side rail 36 is excellently easy.

In the present exemplary embodiment, the resin cover 78 is mounted at the barrier net anchoring portion 38B of the barrier net anchoring bracket 38. The door 78B is provided at the resin cover 78, and is openable and closable between the closed position, at which the resin cover 78 covers the anchoring hole 76 formed in the barrier net anchoring portion 38B from the vehicle cabin inner side, and the open position, at which the anchoring hole 76 is exposed to the vehicle cabin inner side. Therefore, the anchoring hole 76 may be prevented from being visible from the vehicle cabin inner side when the barrier net 28 is not in use, by the door 78B being disposed at the closed position. Further, the inclined portion 54A of the roof head lining 54 is sandwiched between the resin cover 78 and the barrier net anchoring portion 38B. Therefore, unwanted flexing ("sagging") of the roof head lining 54 may be even more excellently suppressed.

In the present exemplary embodiment, the protector 86 is mounted at the barrier net anchoring portion 38B of the barrier net anchoring bracket 38. The protector 86 is disposed between the barrier net anchoring portion 38B and the inflator 46, and prevents the upper anchor rod 34 of the barrier net 28 from abutting against the inflator 46 when being fitted into and anchored at the anchoring hole 76. Therefore, damage to the inflator 46 by the upper anchor rod 34 may be avoided.

In the present exemplary embodiment, the inflator 46 that is disposed with its length direction along the vehicle front-rear direction is fixed to the roof side rail 36 via the mounting brackets 62 at both the vehicle forward side and the vehicle rearward side of the barrier net anchoring bracket 38. Thus, the inflator 46 may be fixed to the roof side rail 36 securely.

In the present exemplary embodiment, in the state in which the rear seatback 20 is tilted forward and the luggage space 18 is enlarged, the barrier net anchoring bracket 38 is positioned such that the barrier net anchoring bracket 38 is disposed just above the housing 26 for stowing the barrier net, as viewed in the vehicle width direction. Therefore, when the barrier net 28 is in use, the barrier net 28 extends in the up-down direction at the front end of the luggage space 18, and the appearance of the barrier net during use may be made excellent.

The exemplary embodiment described above has a structure in which the barrier net anchoring bracket 38 is disposed just above the housing 26 as viewed in the vehicle width direction in the state in which the rear seatback 20 is tilted forward. However, the inventions relating to claims 1 to 8 are not limited thus. Structures are applicable in which the barrier net anchoring bracket 38 is disposed to be offset to the vehicle forward side or the vehicle rearward side relative to the housing 26.

The exemplary embodiment described above has a structure in which the inflator 46 is fixed to the roof side rail 36 via the mounting brackets 62 at both the vehicle forward side and the vehicle rearward side of the barrier net anchoring bracket 38. However, the inventions relating to claims 1 to 7 are not limited thus. Structures are also applicable in which the inflator 46 is fixed using the barrier net anchoring bracket 38 and one or both of the pair of front and rear mounting brackets 62 is omitted.

The exemplary embodiment described above has a structure in which the protector 86 is mounted at the barrier net anchoring portion 38B, but the inventions relating to claims 1 to 6 are not limited thus. Structures are also applicable in which the protector 86 is omitted.

The exemplary embodiment described above has a structure in which the roof head lining 54 is sandwiched between the barrier net anchoring portion 38B and the resin cover 78, but the inventions relating to claims 1 to 5 are not limited thus. Structures are also applicable in which the roof head lining 54 and the resin cover 78 are not engaged, and the door 78B of the resin cover 78 is omitted.

The exemplary embodiment described above has a structure in which the lower end portion of the body fixing portion 38A that is attached and fixed to the roof side rail 36 is disposed at a position that does not overlap with the barrier net anchoring portion 38B and the inflator 46 as viewed in the attachment direction. However, the inventions relating to claims 1 to 4 are not limited thus. Structures are also applicable in which the attachment portion to the roof side rail 36 of the body fixing portion 38A is disposed at a position that overlaps with one or both of the barrier net anchoring portion 38B and the inflator 46 as viewed in the attachment direction.

The exemplary embodiment described above has a structure in which the body fixing portion 38A and barrier net anchoring portion 38B of the barrier net anchoring bracket 38 extend from the joining portion 38C diagonally to the lower side and to the vehicle width direction outer side. However, the inventions relating to claims 1 to 3 are not limited thus. The extension directions of the body fixing portion 38A and the barrier net anchoring portion 38B may be modified as appropriate.

The exemplary embodiment described above has a structure in which the barrier net anchoring bracket 38 is formed in an open cross-section shape that opens to the lower side. However, the inventions relating to claims 1 and 2 are not limited thus. Structures are also applicable in which the barrier net anchoring bracket is formed in an open cross-section shape that opens to the upper side, and the barrier net anchoring bracket is formed in a closed cross-section shape (a tube that is open only to the vehicle front-rear direction).

The exemplary embodiment described above has a structure in which the inflator 46 is disposed inside the cross sectional area of the barrier net anchoring bracket 38 (between the body fixing portion 38A and the barrier net anchoring portion 38B). However, the invention relating to claim 1 is not limited thus. It is sufficient that the barrier net anchoring bracket 38 be disposed at a position that overlaps with the inflator 46 in the vehicle as viewed in the vehicle width direction, and structures are applicable in which the inflator 46 is disposed outside the cross sectional area of the barrier net anchoring bracket 38. For example, the body fixing portion 38A of the barrier net anchoring bracket 38 is omitted and a vehicle width direction outer side end portion of the joining portion 38C is fixed to the roof side rail 36 by a bolt, welding or the like. As a further example, the body fixing portion 38A and joining portion 38C of the barrier net anchoring bracket 38 are omitted, an extension portion that extends to the vehicle width direction outer side from a lower end of the barrier net anchoring portion 38B is specified, and the distal end side of this extension portion is fixed to the roof side rail 36 by a bolt, welding or the like. That is, the invention relating to claim encompasses configurations in which only the barrier net anchoring portion 38B is disposed at a position that overlaps with the inflator 46 as viewed in the vehicle width direction (at the vehicle width direction inner side of the inflator 46), and an extension portion (fixing portion) that extends to the vehicle width direction outer side from the upper end side or lower end side of the barrier net anchoring portion 38B is fixed to the roof side rail 36 at the upper side or lower side of the inflator 46.

In the exemplary embodiment described above, application of the present invention to a station wagon-type automobile is described, but this is not limiting. The present invention may be applied to automobiles of other types that have a luggage space that is continuous with a cabin space, including sports utility types, hatchback types and the like.

The present invention may be embodied with numerous other modifications within a scope not departing from the spirit of the invention. Obviously, the scope of the present invention is not to be limited by the exemplary embodiment described above.

The invention claimed is:

1. A component arrangement structure at a roof side rail, comprising:
   an inflator that is disposed between a rear seat assist grip and a center pillar, fixed to a roof side rail, and supplies gas into a curtain airbag, the rear seat assist grip being fixed to the roof side rail at a vehicle rearward side of the center pillar, and the curtain airbag being arranged along the roof side rail in a folded state; and
   a barrier net anchoring bracket disposed at a position that overlaps with the inflator as viewed in a vehicle width direction, fixed to the roof side rail, and at which an upper anchor portion is to be anchored, the upper anchor portion being provided at a barrier net that divides a vehicle cabin between front and rear.

2. The component arrangement structure at a roof side rail according to claim 1, wherein
   the barrier net anchoring bracket includes a body fixing portion fixed to the roof side rail, and a barrier net anchoring portion disposed at the vehicle width direction inner side relative to the body fixing portion and at which the upper anchor portion of the barrier net is to be anchored, and
   the inflator is disposed between the body fixing portion and the barrier net anchoring portion.

3. The component arrangement structure at a roof side rail according to claim 2, wherein the barrier net anchoring bracket forms an open cross-section shape that opens to the lower side.

4. The component arrangement structure at a roof side rail according to claim 2, wherein an inclined portion that extends diagonally to the lower side and to the vehicle width direction outer side, so as to follow along an inner panel of the roof side rail, is provided at a vehicle width direction outer side end portion of a ceiling member of the vehicle cabin, and
   the barrier net anchoring bracket is disposed between the inclined portion and the inner panel, the body fixing portion is inclined along the inner panel, and the barrier net anchoring portion is inclined along the inclined portion.

5. The component arrangement structure at a roof side rail according to claim 2, wherein the body fixing portion of the barrier net anchoring bracket is disposed at a position at which a portion of the body fixing portion is attached and fixed to the roof side rail does not overlap with the barrier net anchoring portion or the inflator as viewed in an attachment direction.

6. The component arrangement structure at a roof side rail according to claim 2, wherein an anchoring hole at which the upper anchor portion is to be fitted and anchored is formed in the barrier net anchoring portion, a resin cover is mounted at the barrier net anchoring portion, and the ceiling member of the vehicle cabin is sandwiched between the resin cover and the barrier net anchoring portion, the resin cover being provided with a door closable and openable between a closed position that covers the anchoring hole from the vehicle cabin inner side and an open position at which the anchoring hole is exposed to the vehicle cabin inner side.

7. The component arrangement structure at a roof side rail according to claim 2, further comprising a protector disposed between the barrier net anchoring portion and the inflator, mounted to the barrier net anchoring portion, and prevents the upper anchor portion from abutting against the inflator.

8. The component arrangement structure at a roof side rail according to claim 1, wherein the inflator is disposed in a state in which a length direction thereof is along the vehicle front-rear direction, and the inflator is fixed to the roof side rail via mounting brackets at both a vehicle forward side and a vehicle rearward side of the barrier net anchoring bracket.

9. The component arrangement structure at a roof side rail according to claim 1, wherein the barrier net is unwindably rolled up and stowed in a housing provided at an upper end side of a tilting-type rear seatback that structures a rear seat, and
   in a state in which the rear seatback is tilted forward, the barrier net anchoring bracket is disposed above the housing as viewed in the vehicle width direction.

* * * * *